United States Patent Office 3,661,765
Patented May 9, 1972

3,661,765
PROCESS FOR PRODUCTION OF GILSONITE-LIKE BITUMINOUS MATERIAL
Mitsuru Toyoguchi, Yokohama, and Hiroshi Iijima, Tokyo, Japan, assignors to Mitsubishi Oil Co., Ltd., Tokyo, Japan
No Drawing. Filed July 30, 1970, Ser. No. 59,725
Claims priority, application Japan, Aug. 4, 1969, 44/60,992
Int. Cl. C10g 27/04; C10c 3/04, 1/20
U.S. Cl. 208—6
13 Claims

ABSTRACT OF THE DISCLOSURE

A process for the production of a gilsonite-like bituminous material having a penetration of 0 to 1 and a softening point of 130° C. to 180° C. which comprises solvent extracting a material selected from the group consisting of straight asphalt and the vacuum distillation residue obtained in the production of lubricating oils to obtain a material having a penetration of 2 to 30, and then air blowing said material having a penetration of 2 to 30 at a temperature of 200° to 300° C.

DETAILED DISCLOSURE OF THE INVENTION

The invention relates to a process for the production of a gilsonite-like butuminous material from petroleum asphalt.

Gilsonite is a kind of natural asphalt mined in Utah and Colorado in the United States and obtained as dark and brilliant solid in a fairly pure state. It has been converted from crude oil by undergoing various reactions including vaporization, oxidation, polymerization and other processes, under the ground, for a long period of time. Gilsonite has a penetration of 0–1 and a softening point of about 140° C.; also, its hardness is very high. It has extremely low adhesiveness so that it can be readily pulverized into non-sticky particles. Moreover, gilsonite is highly miscible or compatible with other asphalts, paint solvents, etc., and has high weather-resistance.

Owing to such characteristics, gilsonite has been widely used in the manufacture of special products such as paint, varnish, printing ink, asphalt compounds, asphalt roofing, asphalt flooring tile, etc. Although the demand for gilsonite is increasing, it must be imported from the United States since it is available in its natural form only in the States of Utah and Colorado. The total production in Utah and Colorado amounts to about 100,000 tons per year. Thus, the higher price of gilsonite greatly hinders further increase in the demand for it.

It has therefore been desirable from both industrial and commercial viewpoints to provide a bituminous material having the above-mentioned gilsonite-like properties in a large amount, and at a low cost.

After making extensive studies on the process for the production of gilsonite-like bituminous material, the inventors have now devised an effective process whereby the gilsonite-like bituminous material can be produced in large amounts, at low cost.

It has been known that hard blown asphalt has somewhat similar properties to gilsonite. The blown asphalt is usually produced from a vacuum distillation residue obtained from the manufacture of lubricating oil or from soft straight asphalt. The vacuum distillation residue or asphalt is usually blown with a given amount of air (0.5–2 m.³/minute) at a temperature of 230°–270° C. in a converter. The hardest blown asphalt produced in this way has a penetration of 2–3, a softening point of 130°–150° C. and is similar to gilsonite in its general properties. This type of blown asphalt is deficient in that it has greater adhesion than gilsonite and it is difficult to pulverize. Accordingly, a non-sticky powder can never be obtained from the blown asphalt even if it can be pulverized into powder. Moreover, the blown asphalt is less soluble in solvents.

The reason for this is believed to be in the difference in the chemical composition between the blown asphalt and the gilsonite. The chemical composition of hard blown asphalt is generally 40–50% by weight of oily component, 5–8% by weight of resin, and 40–50% by weight of asphaltene, whereas that of gilsonite is 10–30% by weight of oily component, 10–30% by weight of resin, and 40–50% by weight of asphaltene.

It is understood that the blown asphalt contains more oily component and less resin as compared to gilsonite. Greater content of oily component and less content of resin results in poorer asphaltenes peptization. Asphaltene peptization favors the formation of asphaltene micelle structure to thereby increase the toughness of asphalt. Also, the predominant amount of low molecular oily component increases the adhesiveness of the powder when pulverized. Moreover, less resin content and low resin/asphaltene ratio result in poor solubility in solvents.

Reactions that occur during the airblowing process are exothermic ones and involve dehydrogenation, oxidation, polymerization, etc., which results in the gradual hardening of asphalt. The composition of the asphalt during airblowing is changed, resulting in a reduction of resin content and increase in asphaltene content. The decrease of oily component is relatively small. Accordingly, the hard blown asphalt has a higher oily component and lower resin content as compared to gilsonite.

In order to obtain a less oily, resin-rich and hard asphalt as seen in gilsonite, it is necessary to use as the feed stock for the blowing, materials which have been preliminarily treated to reduce the oily content and increase the resin content.

For attaining the above objects, the inventors have now found that the preliminary treatment of the raw materials to extract the oily component with a solvent is quite effective to attain the desired result. Preferably, the preliminary treatment is a propane deasphalting process.

The preferred process of this invention comprises first extracting the oily component from the residue obtained from the vacuum distillation of petroleum to manufacture lubricating oil or from straight asphalt by propane deasphalting. Of course, the petroleum can be asphaltic, semi-asphaltic, or non-asphaltic petroleum.

The residue or asphalt has a pentration of the order of 30–700. The extraction is carried out using a solvent to residue or asphalt ratio of 3:1–10:1, a temperature of 50°–85° C. and pressure of about 40 kg./cm.² to thereby obtain the material with low oily content and having the pentration of 2–30 in the yield of 60–70%. The thus obtained solvent extracted material is then airblown at a temperature of 200°–300° C., using conventional blowing equipment to give a less oily and resin-rich gilsonite-like butuminous material having the penetration of 0–1 and the softening point of 130°–180° C. The particular air rate and time of the air blowing need not be extensively discussed herein since the time and air rate employed are those commonly used in the known airblowing processes of the prior art, and can be easily selected so as to produce a product with the desired softening point. Very suitable results can be obtained with an air rate between about 0.5–2 m.³/minute per ton of solvent extracted material.

EXAMPLE 1

Arabian straight asphalt having the penetration of 400 was used as the starting material. This material was treated in a propane deasphalting equipment under the conditions of the solvent ratio of 6:1, the temperature of 70°–85° C., and the pressure of 40 kg./cm.² to extract oily components to obtain less oily blowing material having the penetration of 9 and the softening point of 67.6° C. in the yield of 60%. This treated asphalt was then subjected to airblowing at 260° C. using conventional blowing equipment to give gilsonite-like bituminous material having the following properties:

|  | Gilsonite-like bituminous material | Gilsonite |
|---|---|---|
| Penetration* | 1 | 1 |
| Softening point (R & B) (° C.) | 147.0 | 142.5 |
| Soluble in carbon tetrachloride (percent by wt.) | 99.9 | 99.9 |
| Oily component (percent by wt.) | 30.1 | 27.7 |
| Resin (percent by wt.) | 23.4 | 25.4 |
| Asphaltene (percent by wt.) | 46.5 | 46.9 |

*Penetration is determined in the conventional manner wherein the load, time, and temperature are 100 g., 5 seconds, and 25° C. (77° F.) respectively. A description of the conventional means to determine penetration is found on pages 664–668 of "Asphalts and Allied Substances," by Abraham, 3rd edition, D. Van Nostrand Co., New York.

EXAMPLE 2

Wafra straight asphalt having the penetration of 300 was used as the raw material, and treated in propane deasphalting equipment under the conditions used in Example 1, to give a blowing material having the penetration of 11 and the softening point of 67.2° C. in the yield of 65%. This material was then subjected to airblowing at the temperature of 260° C. to give gilsonite-like bituminous material with the following properties:

|  | Gilsonite-like material | Gilsonite |
|---|---|---|
| Penetration | 1 | 1 |
| Softening point (R & B) (° C.) | 145.3 | 142.5 |
| Soluble in CCl₄ (percent by wt.) | 99.9 | 99.9 |
| Oily component (percent by wt.) | 29.7 | 27.7 |
| Resin (percent by wt.) | 20.3 | 25.4 |
| Asphaltene (percent by wt.) | 50.0 | 46.9 |

What is claimed is:

1. A process for the production of a non-sticky gilsonite-like bituminous material having penetration of 0–1 and softening point of 130° C.–180° C., and containing 10 to 30% by weight of oily component which comprises
   (a) solvent extracting a member selected from the group consisting of straight asphalt and vacuum distillation residue obtained from the production of lubricating oil to obtain a material having a penetration of 2–30;
   (b) airblowing the solvent extracted material having a penetration of 2–30 at a temperature of 200°–300° C.; and
   (c) obtaining a non-sticky gilsonite-like bituminous material having penetration of 0–1 and a softening point of 130°–180° C., and containing 10 to 30% by weight of oily component.

2. The process of claim 1 wherein said solvent extracting is a propane deasphalting process.

3. The process of claim 1 wherein said solvent extracting is conducted employing a solvent to member ratio of 3 to 1 to 10 to 1, a temperature of 50° to 85° C. and a pressure of about 40 kilograms per square centimeter.

4. The process of claim 1 wherein said member is straight asphalt.

5. The process of claim 1 wherein said gilsonite-like bituminous material has a penetration of 1, a softening point of 147° C., contains 30.1% oily component, 23.4% resin, and 46.5% asphaltene.

6. The process of claim 1 wherein said gilsonite-like bituminous material has a penetration of 1, a softening point of 145.3° C., contains 29.7% oily component, 20.3% resin, and 50% asphaltene.

7. The process of claim 1 wherein said member is straight asphalt; said solvent extracting is a propane deasphalting process carried out using a solvent to asphalt ratio of 3 to 1 to 10 to 1, a temperature of 50° to 85° C. and a pressure of about 40 kilograms per square centimeter.

8. The process of claim 1 wherein said member is the residue obtained from the vacuum distillation of petroleum to produce lubricating oil.

9. The process of claim 8 wherein said solvent extracting is a propane deasphalting process carried out using a solvent to asphalt ratio of 3 to 1 to 10 to 1, a temperature of 50° C. to 85° C. and a pressure of about 40 kilograms per square centimeter.

10. The process of claim 1 wherein said solvent extracting is a deasphalting process with a solvent selected from the group consisting of propane, butane, and mixtures thereof.

11. The process of claim 1 wherein said gilsonite-like bituminous material contains 10–30% by weight of resin and 40–50% by weight of asphaltene.

12. The process of claim 1 wherein said air blowing employs an air rate between about 0.5–2m.³/minute per ton of solvent extracted material and is conducted for about 10–18 hours.

13. The process of claim 12 wherein said solvent extracting is a propane deasphalting process carried out using a solvent to asphalt ratio of 3:1 to 10:1, a temperature of 50 to 85° C. and a pressure of about 40 kilograms per square centimeter; and wherein said gilsonite-like bituminous material contains 10–30% by weight of resin and 40–50% by weight of asphaltene.

References Cited

UNITED STATES PATENTS

| 2,415,697 | 2/1947 | Knowles et al. | 208—6 |
| 2,317,150 | 4/1943 | Lovell et al. | 208—6 |
| 1,306,520 | 6/1919 | Burkley | 208—6 |

DELBERT E. GANTZ, Primary Examiner

V. O'KEEFE, Assistant Examiner